(12) United States Patent
Ito et al.

(10) Patent No.: US 9,340,198 B2
(45) Date of Patent: May 17, 2016

(54) DRIVE CONTROL DEVICE OF HYBRID VEHICLE

(75) Inventors: Yoshiki Ito, Hamamatsu (JP); Masaaki Tagawa, Hamamatsu (JP); Masakazu Saito, Hamamatsu (JP); Hitoshi Ohkuma, Hamamatsu (JP); Yukihiro Hosoe, Hamamatsu (JP)

(73) Assignee: SUZUKI MOTOR CORPORATION, Hamamatsu-shi, Shizuoka (JP)

(*) Notice: Subject to any disclaimer, the term of this patent is extended or adjusted under 35 U.S.C. 154(b) by 108 days.

(21) Appl. No.: 13/985,467

(22) PCT Filed: Feb. 17, 2011

(86) PCT No.: PCT/JP2011/053366
§ 371 (c)(1),
(2), (4) Date: Nov. 26, 2013

(87) PCT Pub. No.: WO2012/111124
PCT Pub. Date: Aug. 23, 2012

(65) Prior Publication Data
US 2014/0081499 A1   Mar. 20, 2014

(51) Int. Cl.
*B60W 20/00* (2006.01)
*B60W 30/18* (2012.01)
*B60K 6/445* (2007.10)
(Continued)

(52) U.S. Cl.
CPC .............. *B60W 20/106* (2013.01); *B60K 6/445* (2013.01); *B60W 10/06* (2013.01); *B60W 10/08* (2013.01); *B60W 10/26* (2013.01); *B60W 20/00* (2013.01); *B60W 30/1882* (2013.01); *B60W 20/1062* (2013.01); *B60W 30/18127* (2013.01); *B60W 2710/0666* (2013.01); *B60W 2710/083* (2013.01); *B60W 2710/242* (2013.01); *Y02T 10/6239* (2013.01); *Y02T 10/6286* (2013.01); *Y02T 10/84* (2013.01); *Y02T 10/92* (2013.01); *Y10S 903/93* (2013.01)

(58) Field of Classification Search
CPC ....................... B60W 20/106; B60W 30/1882
See application file for complete search history.

(56) References Cited

U.S. PATENT DOCUMENTS

2011/0004364 A1* 1/2011 Sawada et al. .................. 701/22

FOREIGN PATENT DOCUMENTS

| JP | 2004-262275 A | 9/2004 |
|---|---|---|
| JP | 2005-16570 A | 1/2005 |

(Continued)

OTHER PUBLICATIONS

Mashadi et al., "Dual-Mode Power-Split Transmission for Hybrid Electric Vehicles", IEEE Transactions on Vehicular Technology, vol. 59(7), Sep. 2010, pp. 3223-3232.*

(Continued)

*Primary Examiner* — Todd Melton
(74) *Attorney, Agent, or Firm* — Flynn, Thiel, Boutell & Tanis, P.C.

(57) ABSTRACT

A drive control device of a hybrid vehicle including a motor torque instruction value calculator, an electric power loss predictor, an electric power upper limit/lower limit value calculator, and a target electric power calculator are arranged, and the motor torque instruction value calculator calculates torque instruction values of a plurality of motor generators using a torque balance equation including target engine torque required at a target engine operating point and an electric power balance equation including target electric power.

2 Claims, 13 Drawing Sheets

(51) Int. Cl.
  *B60W 10/06* (2006.01)
  *B60W 10/08* (2006.01)
  *B60W 10/26* (2006.01)
  *B60W 30/188* (2012.01)

(56) References Cited

FOREIGN PATENT DOCUMENTS

| JP | 2007-22483 A | 2/2007 |
|---|---|---|
| JP | 2007-99244 A | 4/2007 |
| JP | 2008-12992 A | 1/2008 |
| JP | 2010-273520 A | 12/2010 |

OTHER PUBLICATIONS

Form PCT/ISA/210 International Search Report issued in International Application No. PCT/JP2011/053366 with English translation, date of mailing Jun. 14, 2011 (5 pages).

\* cited by examiner

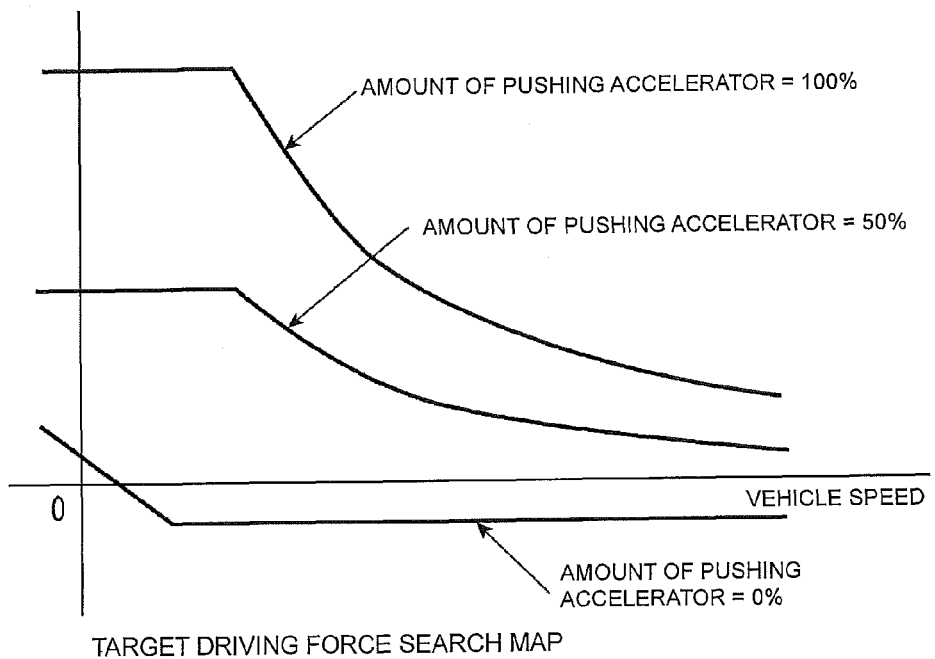

TARGET ENGINE OPERATING POINT SEARCH MAP

ALIGNMENT CHART IN CASE WHERE VEHICLE SPEED
CHANGES AT SAME ENGINE OPERATING POINT

LINE IN WHICH ENGINE EFFICIENCY IS HIGHEST
AND LINE IN WHICH TOTAL EFFICIENCY IS HIGHEST

EFFICIENCY ON EQUI-POWER LINE

ALIGNMENT CHART OF POINTS (D, E, AND F) ON EQUI-POWER LINE

ALIGNMENT CHART IN STATE OF LOW GEAR RATIO

ALIGNMENT CHART IN STATE OF
INTERMEDIATE GEAR RATIO

ALIGNMENT CHART IN STATE OF
HIGH GEAR RATIO

ALIGNMENT CHART IN STATE IN WHICH CIRCULATION OF POWER OCCURS

DRIVE CONTROL DEVICE OF HYBRID VEHICLE

TECHNICAL FIELD

The present invention relates to a control device of a hybrid vehicle that includes a plurality of power sources, combines the power thereof using a differential gear mechanism, and inputs or outputs the power to a driving shaft, and more particularly, to a drive control device of a hybrid vehicle that improves the control accuracy of the SOC or prevents a battery from being excessively loaded by controlling the operating point and the motor torque of an engine in consideration of the electric power loss of a motor.

BACKGROUND ART

Conventionally, as a form of a hybrid vehicle including an electric motor and an internal combustion engine other than a serial form and a parallel form, as disclosed in U.S. Pat. Nos. 3,050,125, 3,050,138, 3,050,141, 3,097,572, and the like, there is a form in which the torque of the power of the internal combustion engine is converted by dividing the power of the internal combustion engine to a power generator and a driving shaft using one planetary gear (a differential gear mechanism having three rotating components) and two electric motors and driving an electric motor arranged at the driving shaft by using electric power generated by the power generator.

This will be referred to as a "three-axis type".

According to this conventional technology, the operating point of the internal combustion engine can be set to a point including stop, and accordingly, the fuel efficiency can be improved.

However, although not as much as for the serial form, since an electric motor having a relatively high torque is necessary for acquiring sufficient driving-shaft torque, and the amount of transmission and reception of electric power between the power generator and the electric motor increases in a low gear ratio region, the electric loss increases, and there is still room for improvement.

As methods for solving this point, there are methods disclosed in U.S. Pat. No. 3,578,451 and Japanese Patent Application Laid-Open (JP-A) No. 2004-15982, and JP-A No. 2002-281607 applied by the applicants of the present invention.

In the method disclosed in JP-A No. 2002-281607, a driving shaft connected to an output shaft of an internal combustion engine, a first motor generator (hereinafter, referred to as "MG1"), a second motor generator (hereinafter, referred to as "MG2"), and a drive wheel is connected to each rotating component of a differential gear mechanism having four rotating components, the power of the internal combustion engine and the power of the MG1 and MG2 are combined, and the combined power is output to the driving shaft.

In addition, by arranging an output shaft of an internal combustion engine and a driving shaft in a rotating component arranged on the inner side on an alignment chart and arranging the MG1 (the internal combustion engine side) and MG2 (the driving shaft side) in a rotating component disposed on the outer side on the alignment chart, the ratio of power that is in charge of the MG1 and MG2 to the power delivered to the driving shaft from the internal combustion engine can decrease, whereby the MG1 and MG2 can be miniaturized, and the transmission efficiency of the drive device can be improved.

This will be referred to as a "four-axis type".

In addition, a method disclosed in U.S. Pat. No. 3,578,451 similar to the above-described method has been proposed, in which an additional fifth rotating component is included, and a brake stopping this rotating component is arranged.

In the above-described conventional technology, as disclosed in U.S. Pat. No. 3,050,125, the power to be output by the internal combustion engine is calculated by adding the driving force required for the vehicle and the electric power required for charging a storage battery, and, out of a combination of the torque and the rotation speed corresponding to the power, a point at which the efficiency is as high as it possibly can be is calculated and set as a target engine operating point.

Then, the engine rotation speed is controlled by controlling the MG1 such that the operating point of the internal combustion engine becomes the target operating point.

CITATION LIST

Patent Literature

PTL 1 JP-A No. 2008-12992

SUMMARY OF INVENTION

Technical Problem

However, in a conventional drive control device of a hybrid vehicle, in the case of the "three-axis type", the torque of the MG2 does not have an effect on the torque balance. Accordingly, torque output from the driving shaft by the internal combustion engine and the MG1 is calculated based on the torque of the MG1 wherein the torque of the MG1 is feedback-controlled so as to allow the engine rotation speed to approach a target value, and the torque of the MG2 is controlled so as to have a value acquired by subtracting the calculated value from a target driving force, whereby the target driving force can be output from the driving shaft even in a case where the engine torque changes.

However, in the case of the "four-axis type", the driving shaft and the MG2 form mutually-different shafts, and the torque of the MG2 influences the torque balance so as to have an effect on the control of the engine rotation speed, and accordingly, there is a disadvantage that the control method of the "three-axis" type may not be used.

In addition, in JP-A No. 2004-15982, which is the case of the "four-axis type", a method for controlling the engine rotation speed and the driving force has been disclosed in which the torques of the MG1 and the MG2 in a case of driving without charging or discharging a battery are calculated using a torque balance equation, and the feedback control of the rotation speeds is performed.

However, control in a case where the battery is charged or discharged, for example, in a case where power assistance is performed using the electric power of the battery has not been mentioned.

In addition, in PTL 1 described above, in a hybrid system including an internal combustion engine and a plurality of motor generators, a technology for controlling an internal combustion engine has been disclosed in which the engine rotation speed is set high at the operating point of the internal combustion engine.

At this time, in PTL 1 described above, the control of a plurality of motor generators is not clear, and the control of a plurality of motor generators in a case where the battery is charged and discharged is not clear.

In addition, when the control is performed, the internal combustion engine and a plurality of motor generators are mechanically operated to be connected to each other, and it is necessary to perform control with the plurality of motor generators being associated with each other so as to balance the torque thereof while the operating point of the internal combustion engine is maintained at a target value, and, in a case where the battery is charged and discharged, the electric power needs to be balanced.

Thus, it is necessary to perform control so as to achieve both.

In addition, when the torque is controlled to be balanced with a plurality of motor generators being associated with each other, even in a case where feedback control is performed, there is inconvenience that a change in the torque of the internal combustion engine influences the driving torque depending on the content of the control process.

Thus, the applicants invented a control device in which, in a hybrid vehicle driving a driving shaft connected to drive wheels by combining the output of an internal combustion engine and the power of the first and second motor generators MG1 and MG2, a target driving power is acquired based on a target driving force having the amount of the operation of the accelerator and the vehicle speed as parameters and the vehicle speed, target charge/discharge power is acquired based on the SOC, electric power loss is predicted based on the vehicle speed and the target driving force, target engine power is calculated by adding the target electric power and the electric power loss to the target driving power, a target engine operating point is acquired based on the target engine power, the target electric power that is a target value of input/output electric power from the battery is acquired based on a difference between the target driving power and the target engine power, and control instruction values of the torque of the MG1 and the torque of the MG2 are calculated using a torque balance equation including the target engine torque and an electric power balance equation including the target electric power.

According to this method, since the target engine power is calculated in consideration of the electric power loss, power generation can be performed so as to control the SOC within a predetermined range more precisely while the target driving force is output.

However, in a case where the target driving power is higher than the target engine power, in other words, in a case where the target engine power is limited by the power upper limit of the engine, power assistance using the electric power of the battery is performed. However, in such a case, even when the target engine power is calculated in consideration of the electric power loss, the target engine power is limited by the upper limit power of the engine, and accordingly, the electric power loss is not reflected on the target electric power.

Accordingly, in the case as described above, the electric power corresponding to the electric power loss is unnecessarily consumed, and there is a disadvantage that the battery is over-discharged, or the limit of the discharge electric power of the battery is exceeded.

In addition, in a case where the battery is charged by regenerative braking at the time of deceleration, when the torque of the motor generator is limited based on only the input limit of the battery, the electric power that is actually used for charging is an electric power that is lower than the input limit by the electric power loss.

As a result, there is a disadvantage that the electric power regeneration according to the deceleration is not sufficiently used.

Objects of the present invention is to improve the control accuracy of the SOC of the battery in consideration of the electric power losses of a plurality of motor generators and, in accordance therewith, to secure the protection performance of the battery and to increase the energy recovery efficiency according to the regeneration.

Solution to Problem

Thus, in order to eliminate the above-described disadvantages, there is provided a drive control device of a hybrid vehicle including: an internal combustion engine that includes an output shaft; a driving shaft that is connected to a drive wheel; first and second motor generators; a differential gear mechanism that includes four rotating components connected to a plurality of the motor generators, the driving shaft, and the internal combustion engine; an accelerator opening degree detecting means that detects the accelerator opening degree; a vehicle speed detecting means that detects a vehicle speed; a battery charge state detecting means that detects a charge state of a battery; a target driving power setting means that sets a target driving power based on the accelerator opening degree that is detected by the accelerator opening degree detecting means and the vehicle speed detected by the vehicle speed detecting means; a target charge/discharge power setting means that sets a target charge/discharge power based on at least the charge state of the battery that is detected by the battery charge state detecting means; a target engine power calculating means that calculates a target engine power based on the target driving power of the target driving power setting means and the target charge/discharge power of the target charge/discharge power setting means; a target engine operating point setting means that sets a target engine operating point based on the target engine power and total system efficiency; a motor torque instruction value calculating means that sets torque instruction values of the plurality of the motor generators; an electric power loss predicting means that calculates an estimated power that is an electric power loss based on the vehicle speed and the target driving force; an electric power upper limit/lower limit value calculating means that sets an electric power upper limit and an electric power lower limit for limiting an input/output electric power for the battery based on the estimated power that is the electric power loss and battery state parameters; and a target electric power calculating means that calculates a target electric power based on a difference between the target engine power and the target driving power calculated at the target engine operating point and, when the target electric power comes off a range set by the electric power upper limit and the electric power lower limit, limits the target electric power to the electric power upper limit or the electric power lower limit, wherein the motor torque instruction value calculating means calculates torque instruction values of the plurality of the motor generators using a torque balance equation including the target engine torque acquired at the target engine operating point and an electric power balance equation including the target electric power.

Advantageous Effects of Invention

As described above, according to the present invention, there is provided a drive control device of a hybrid vehicle including: an internal combustion engine that includes an output shaft; a driving shaft that is connected to a drive wheel;

first and second motor generators; a differential gear mechanism that includes four rotating components connected to a plurality of the motor generators, the driving shaft, and the internal combustion engine; an accelerator opening degree detecting means that detects the accelerator opening degree; a vehicle speed detecting means that detects a vehicle speed; a battery charge state detecting means that detects a charge state of a battery; a target driving power setting means that sets a target driving power based on the accelerator opening degree that is detected by the accelerator opening degree detecting means and the vehicle speed detected by the vehicle speed detecting means; a target charge/discharge power setting means that sets a target charge/discharge power based on at least the charge state of the battery that is detected by the battery charge state detecting means; a target engine power calculating means that calculates a target engine power based on the target driving power of the target driving power setting means and the target charge/discharge power of the target charge/discharge power setting means; a target engine operating point setting means that sets a target engine operating point based on the target engine power and total system efficiency; a motor torque instruction value calculating means that sets torque instruction values of the plurality of the motor generators; an electric power loss predicting means that calculates an estimated power that is an electric power loss based on the vehicle speed and the target driving force; an electric power upper limit/lower limit value calculating means that sets an electric power upper limit and an electric power lower limit for limiting an input/output electric power for the battery based on the estimated power that is the electric power loss and battery state parameters; and a target electric power calculating means that calculates a target electric power based on a difference between the target engine power and the target driving power calculated at the target engine operating point and, when the target electric power comes off a range set by the electric power upper limit and the electric power lower limit, limits the target electric power to the electric power upper limit or the electric power lower limit, wherein the motor torque instruction value calculating means calculates torque instruction values of the plurality of the motor generators using a torque balance equation including the target engine torque acquired at the target engine operating point and an electric power balance equation including the target electric power.

Accordingly, by limiting the input/output power in accordance with the state of the battery in consideration of the electric power losses of a plurality of motor generators, the charge/discharge electric power can be appropriately limited in a case where driving assistance is performed using the electric power of the battery, whereby overdischarge or overloading of the battery can be prevented.

In addition, the control accuracy of the SOC of the battery can be improved in consideration of the electric power losses of the plurality of motor generators.

Furthermore, since the control accuracy is high, a range near the limit value of the battery can be used, whereby the amount of regeneration at the time of deceleration can be increased.

In addition, both the target driving force of the motor generator and the charge/discharge near the target preventing overcharge/overdischarge of the battery can be secured in consideration of the operating point of the internal combustion engine.

Furthermore, after the target engine rotation speed is reset so as not to exceed the upper limit value of the target engine rotation speed, a target electric power different from the target charge/discharge power is set based on the target engine rotation speed, and the driving forces of the plurality of motor generators are set based on the optimized target engine operating point and the optimal target electric power preventing overcharge/overdischarge, whereby the internal combustion engine is protected by limiting the engine rotation speed, and the driving force requested by the driver can be satisfied based on the power assistance using the electric power of the battery.

BRIEF DESCRIPTION OF DRAWINGS

FIG. 6 is a target driving force search map formed by a target driving force and a vehicle speed.

FIG. 7 is a target charge/discharge power search table configured by target charge/discharge power and a battery charge state detecting means.

DESCRIPTION OF EMBODIMENTS

Hereinafter, embodiments of the present invention will be described in detail with reference to the drawings.

Embodiment

FIGS. 1 to 20 illustrate embodiments of the present invention.

Figure 1:
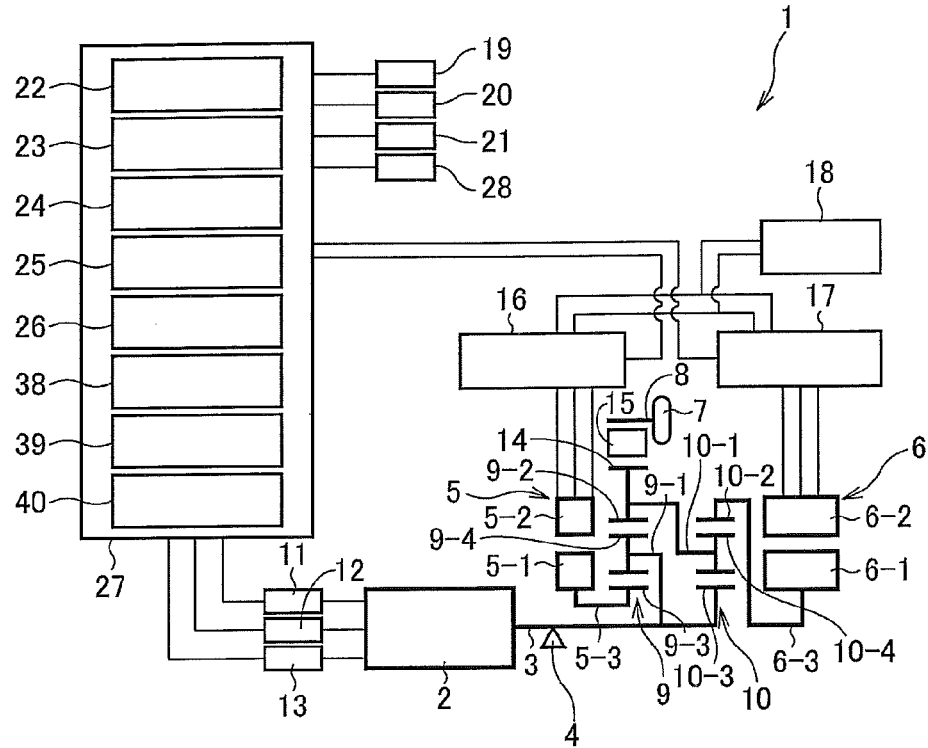
FIG. 1 is a system configuration diagram of a drive control device of a hybrid vehicle.

In FIG. 1, reference numeral 1 represents a drive control device of a hybrid vehicle not illustrated in the figure, in other words, a four-axis-type power input/output device to which the present disclosure is applied.

As illustrated in FIG. 1, in order to control the driving of the vehicle using outputs of an internal combustion engine (also represented as "E/G" or "ENG") 2 and an electric motor, the drive control device (also referred to as a "power input/output device") 1 of the hybrid vehicle includes: a first motor generator (also referred to as "MG1" or "first electric motor") 5 and a second motor generator (also referred to as "MG2" or "second electric motor") 6 that are connected to an output shaft 3 of the internal combustion engine 2 generating a driving force in accordance with the combustion of fuel through a one-way clutch 4 as a driving system, generates driving forces based on electricity, and generates electric energy by being driven; a driving shaft 8 that is connected to a drive wheel 7 of the hybrid vehicle; and a first planetary gear (also referred to as "PG1") 9 and a second planetary gear (also referred to as "PG2") 10 that are connected to the output shaft 3, the first and second motor generators 5 and 6, and the driving shaft 8.

The internal combustion engine 2 includes: an air content adjusting means 11 such as a throttle valve that adjusts the air volume to be suctioned in accordance with the accelerator opening degree (the amount of pressing an accelerator pedal using a foot); a fuel supplying means 12 such as a fuel injection valve that supplies fuel corresponding to the suctioned air volume; and an ignition means 13 such as an ignition device that ignites the fuel.

In the internal combustion engine 2, the combustion state of the fuel is controlled by the air content adjusting means 11, the fuel supplying means 12, and the ignition means 13, and a driving force is generated by the combustion of the fuel.

At this time, the first planetary gear 9, as illustrated in FIG. 1, includes: a first planetary carrier (also referred to as "C1") 9-1; a first ring gear 9-2; a first sun gear 9-3; and a first pinion gear 9-4 and includes: an output gear 14 that is connected to the driving shaft 8 of the drive wheel 7; and an output transmission mechanism (also referred to as a "gear wheel mechanism" or a "differential gear mechanism 15" to be described later) 15 that is formed by a gear wheel, a chain, or the like connecting the output gear 14 to the driving shaft 8.

In addition, the second planetary gear 10, as illustrated in FIG. 1, includes: a second planetary carrier (also referred to as "C2") 10-1; a second ring gear 10-2; a second sun gear 10-3; and a second pinion gear 10-4.

As illustrated in FIG. 1, the first planetary carrier 9-1 of the first planetary gear 9 and the second sun gear 10-3 of the second planetary gear 10 are combined and are connected to the output shaft 3 of the internal combustion engine 2.

In addition, as illustrated in FIG. 1, the first ring gear 9-2 of the first planetary gear 9 and the second planetary carrier 10-1 of the second planetary gear 10 are combined and are connected to the output gear 14 that is an output member connected to the driving shaft 8.

The first motor generator 5 is formed by a first motor rotor 5-1, a first motor stator 5-2, and a first motor rotor shaft 5-3, and the second motor generator 6 is formed by a second motor rotor 6-1, a second motor stator 6-2, and a second motor rotor shaft 6-3.

In addition, as illustrated in FIG. 1, the first motor rotor 5-1 of the first motor generator 5 is connected to the first sun gear 9-3 of the first planetary gear 9, and the second motor rotor 6-1 of the second motor generator 6 is connected to the second ring gear 10-2 of the second planetary gear 10.

Figure 9:
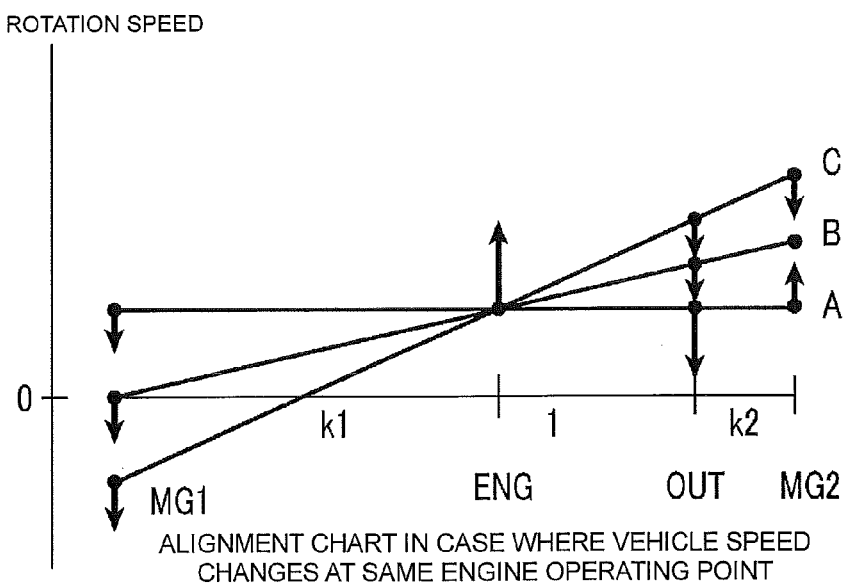
FIG. 9 is an alignment chart in a case where the vehicle speed is changed at the same engine operating point.
Figure 10:
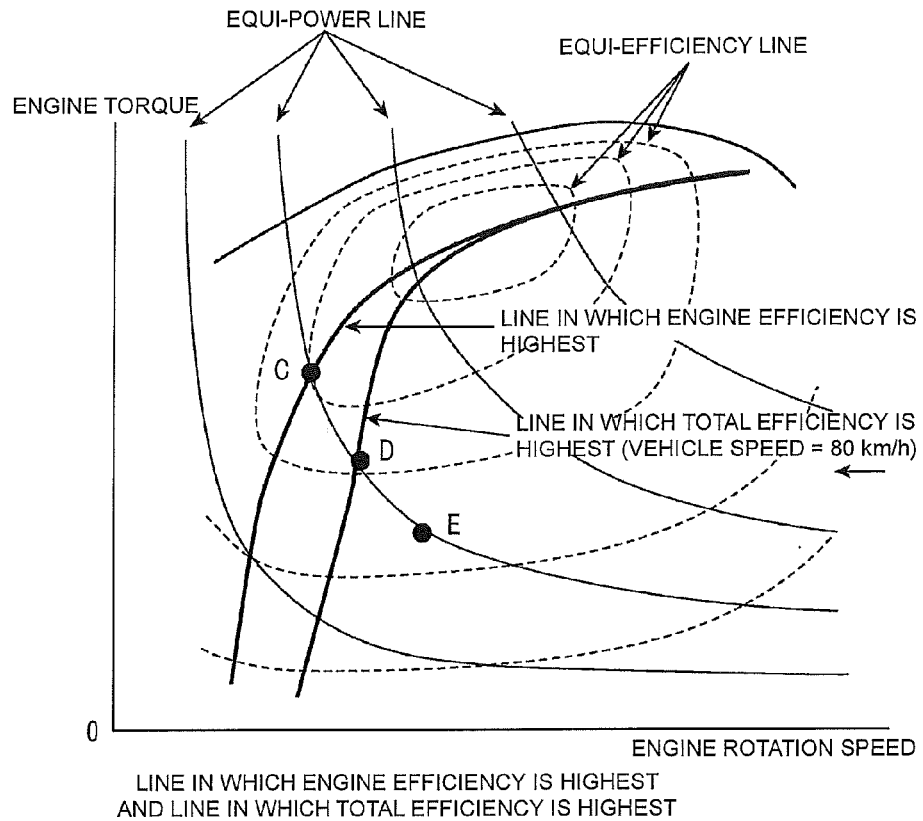
FIG. 10 is a diagram that illustrates a line of the highest engine efficiency that is configured by the engine torque and the engine rotation speed and a line of the highest total efficiency.

In other words, the hybrid vehicle includes the differential gear mechanism 15 that is a gear mechanism connecting four elements formed by the internal combustion engine 2, the first motor generator 5, the second motor generator 6, and the output gear 14 in order of the first motor generator 5, the output gear 14, and the second motor generator 6 on the alignment chart (see FIGS. 9 and 10).

Accordingly, power is transmitted and received among the internal combustion engine 2, the first motor generator 5, the second motor generator 6, and the driving shaft 8.

In addition, a first inverter 16 is connected to the first motor stator 5-2 of the first motor generator 5, and a second inverter 17 is connected to the second motor stator 6-2 of the second motor generator 6.

By using the first and second inverters 16 and 17, the first and second motor generators 5 and 6 are controlled.

In addition, the power source terminals of the first and second inverters 16 and 17 are connected to a battery 18 that is an electrical storage device.

The drive control device 1 of the hybrid vehicle controls the driving of the vehicle by using outputs of the internal combustion engine 2 and the first and second motor generators 5 and 6.

The drive control device 1 of the hybrid vehicle includes: the internal combustion engine 2 having the output shaft 3; the driving shaft 8 connected to the drive wheel 7; the first and second motor generators 5 and 6, the differential gear mechanism 15 having four rotating components connected to the first and second motor generators 5 and 6, which are a plurality of motor generators, the driving shaft 8, and the internal combustion engine 2; an accelerator opening degree detecting means 19 detecting the accelerator opening degree; a vehicle speed detecting means 20 detecting the vehicle speed; a battery charge state detecting means 21 detecting the charge state of the battery 18; a target driving power setting means 22 that sets a target driving power based on the accelerator opening degree detected by the accelerator opening degree detecting means 19 and the vehicle speed detected by the vehicle speed detecting means 20; a target charge/discharge power setting means 23 setting a target charge/discharge power based on at least the charge state of the battery 18 detected by the battery charge state detecting means 21; a target engine power calculating means 24 calculating a target engine power using the target driving power setting means 22 and the target charge/discharge power setting means 23; a target engine operating point setting means 25 setting a target engine operating point formed by the target engine power and the total system efficiency; and a motor torque instruction value calculating means 26 setting torque instruction values Tmg1 and Tmg2 of the first and second motor generators 5 and 6 that are the plurality of motor generators.

At this time, the air content adjusting means 11, the fuel supplying means 12, the ignition means 13 of the internal combustion engine 2, the first motor stator 5-2 of the first motor generator 5, and the second motor stator 6-2 of the second motor generator 6 are connected to a drive control unit 27 that is a control system of the drive control device 1 of the hybrid vehicle.

The drive control unit 27 of the drive control device 1 of the hybrid vehicle, as illustrated in FIG. 1, includes the accelerator opening degree detecting means 19, the vehicle speed detecting means 20, the battery charge state detecting means 21, and the engine rotation speed detecting means 28.

The accelerator opening degree detecting means 19 detects the accelerator opening degree that is the amount of pushing the accelerator pedal using a foot.

The vehicle speed detecting means 20 detects the vehicle speed (vehicle velocity) of the vehicle.

The battery charge state detecting means 21 detects the charge state SOC of the battery 18.

In addition, the drive control unit 27 used for calculating a target operating point, as illustrated in FIG. 1, includes the target driving power setting means 22, the target charge/discharge power setting means 23, the target engine power calculating means 24, the target engine operating point setting means 25, and the motor torque instruction value calculating means 26.

The target driving power setting means 22 has a function of setting the target driving power for driving the hybrid vehicle based on the accelerator opening degree detected by the accelerator opening degree detecting means 19 and the vehicle speed detected by the vehicle speed detecting means 20.

Figure 2:
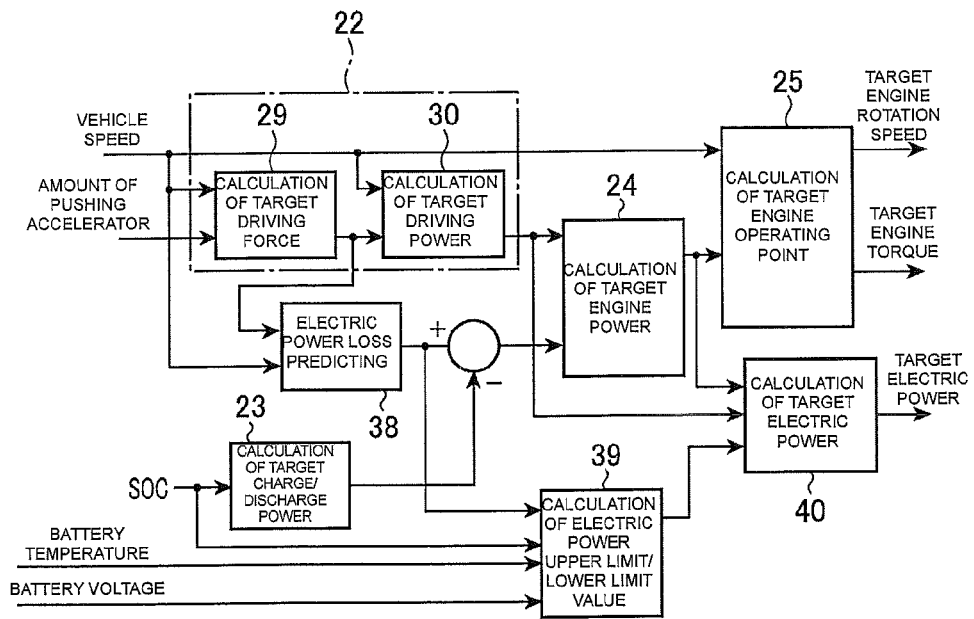
FIG. 2 is a control block diagram for calculating a target operating point.

In other words, the target driving power setting means 22, as illustrated in FIG. 2, includes a target driving force calculating unit 29 and a target driving power calculating unit 30, and the target driving force calculating unit 29 sets a target driving force using the target driving force search map illustrated in FIG. 6 in accordance with the accelerator opening degree detected by the accelerator opening degree detecting means 19 and the vehicle speed detected by the vehicle speed detecting means 20.

At this time, the target driving force is set to a negative value so as to be a driving force in a deceleration direction corresponding to engine braking in a high vehicle speed region at the accelerator opening degree=0 and is set to a positive value for slow driving in a low vehicle speed region.

In addition, the target driving power calculating unit 30 calculates a target driving power required for driving the vehicle with the target driving force by multiplying the target driving force set by the target driving force calculating unit 29 by the vehicle speed detected by the vehicle speed detecting means 20.

The target charge/discharge power setting means 23 sets the target charge/discharge power based on at least the charge state SOC of the battery 18 that is detected by the battery charge state detecting means 21.

In this embodiment, the target charge/discharge power is set by searching a target charge/discharge power search map not illustrated in the figure in accordance with the charge state SOC of the battery and the vehicle speed.

The target engine power calculating means 24 calculates the target engine power based on the target driving power set by the target driving power setting means 22 and the target charge/discharge power set by the target charge/discharge power setting means 23.

In this embodiment, the target engine power is acquired by subtracting the target charge/discharge power from the target driving power.

The target engine operating point setting means 25 sets a target engine operating point based on the target engine power and the efficiency of the whole system.

The motor torque instruction value calculating means 26 sets the torque instruction values Tmg1 and Tmg2 of the first and second motor generators 5 and 6 that are the plurality of motor generators.

The target charge/discharge power setting means 23 sets the absolute value of the target charge/discharge power to decrease as the vehicle speed decreases.

Figure 3:
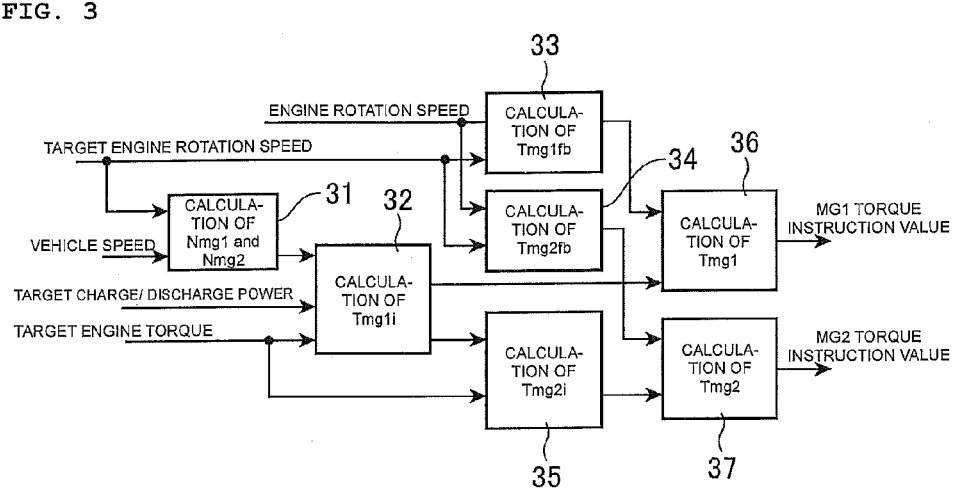
FIG. 3 is a control block diagram for calculating motor torque instruction values.

The drive control unit 27 used for calculating the torque instruction values, as illustrated in FIG. 3, includes first to seventh calculation units 31 to 37.

The first calculation unit 31 calculates an MG1 rotation speed Nmg1 of the first motor generator 5 and an MG2 rotation speed Nmg2 of the second motor generator 6 in a case where the engine rotation speed is the target engine rotation speed Net based on the target engine rotation speed (see FIG. 2) calculated by the target engine operating point setting means 25 and the vehicle speed (vehicle velocity) supplied from the vehicle speed detecting means 20.

The second calculation unit 32 calculates a basic torque Tmg1$i$ of the first motor generator 5 based on the MG1 rotation speed Nmg1 and the MG2 rotation speed Nmg2 calculated by the first calculation unit 31 and the target engine torque (see FIG. 2) calculated by the target engine operating point setting means 25.

The third calculation unit 33 calculates a feedback correction torque Tmg1$fb$ of the first motor generator 5 based on the engine rotation speed supplied from the engine rotation speed detecting means 28 and the target engine torque (see FIG. 2) calculated by the target engine operating point setting means 25.

The fourth calculation unit 34 calculates a feedback correction torque Tmg2$fb$ of the second motor generator 6 based on the engine rotation speed supplied from the engine rotation speed detecting means 28 and the target engine torque (see FIG. 2) calculated by the target engine operating point setting means 25.

The fifth calculation unit 35 calculates a basic torque Tmg2$i$ of the second motor generator 6 based on the basic torque Tmg1i of the first motor generator 5 supplied from the second calculation unit 32 and the target engine torque (see FIG. 2) calculated by the target engine operating point setting means 25.

The sixth calculation unit 36 calculates a torque instruction value Tmg1 of the first motor generator 5 based on the basic torque Tmg1$i$ of the first motor generator 5 supplied from the second calculation unit 32 and the feedback correction torque Tmg1$fb$ of the first motor generator 5 supplied from the third calculation unit 33.

The seventh calculation unit 37 calculates a torque instruction value Tmg2 of the second motor generator 6 based on the feedback correction torque Tmg2$fb$ of the second motor generator 6 supplied from the fourth calculation unit 34 and the basic torque Tmg2$i$ of the second motor generator 6 supplied from the fifth calculation unit 35.

Accordingly, the advantages of the above-described present invention are as follows.

(1) A plurality of motor generators 5 and 6 in a case where the battery 18 is charged or discharged can be controlled.

In addition, both the target driving force and the target charging/discharging can be secured in consideration of the operating point of the internal combustion engine 2.

Furthermore, by finely correcting the torque instruction values of the plurality of motor generators 5 and 6, the engine rotation speed can approach the target value in a speedy manner.

In addition, since the engine operating point can match the target operating point, an appropriate operating state can be formed.

(2) As control of the plurality of motor generators 5 and 6 in a case where the battery 18 is charged or discharged in a hybrid system including the internal combustion engine 2 and the plurality of motor generators 5 and 6, in a case where control is performed in which both the target driving force and the target charging/discharging are secured in consideration of the operating point of the internal combustion engine 2, a torque variation of the internal combustion engine 2 is optimized so as not to influence the driving torque, whereby the drivability and the driving feeling can be improved.

In addition, in the drive control device 1 of the hybrid vehicle, an electric power loss predicting means 38 calculating an estimated power that is an electric power loss based on the vehicle speed and the target driving force, an electric power upper limit/lower limit value calculating means 39 setting an electric power upper limit and an electric power lower limit for limiting the input/output electric power for the battery based on the estimated power that is the electric power loss and the battery state parameters, and a target electric power calculating means 40 calculating a target electric power based on a difference between the target engine power calculated based on the target engine operating point and the target driving power and limiting the target electric power to the electric power upper limit or the electric power lower limit when the target electric power comes off a range set based on the electric power upper limit and the electric power lower limit are arranged. In addition, the motor torque instruction value calculating means 26 is configured to calculate the torque instruction values of the plurality of motor generators 5 and 6 using the torque balance equation including the target engine torque acquired based on the target engine operating point and the electric power balance equation including the target electric power.

Accordingly, by limiting the input/output power in accordance with the state of the battery 18 in consideration of the electric power losses of the plurality of motor generators 5 and 6, the charge/discharge electric power in a case where driving assistance is performed using the electric power of the battery 18 can be appropriately limited, whereby overdischarge or overload of the battery 18 can be prevented.

In addition, the control accuracy of the SOC of the battery 18 can be improved in consideration of the electric power losses of the plurality of motor generators 5 and 6.

Furthermore, since the control accuracy is high, a range near the limit values of the battery 18 can be used, whereby the amount of regeneration at the time of deceleration can increase.

In addition, both the securement of the target driving forces of the plurality of motor generators 5 and 6 and the securement of charging/discharging near the target in which overcharging/overdischarging of the battery 18 can be prevented can be acquired in consideration of the operating point of the internal combustion engine 2.

In addition, after the target engine rotation speed is reset so as not to exceed the upper limit value of the target engine rotation speed, a target electric power different from the target charge/discharge power is set based thereon, and the driving forces of the plurality of motor generators 5 and 6 are set based on the optimized target engine operating point and the optimal target electric power for which overcharging/overdischarging are prevented, whereby the internal combustion engine 2 is protected by limiting the engine rotation speed, and the driving force requested from the driver can be satisfied by performing power assistance using the electric power of the battery 18.

Described in more detail, the electric power loss predicting means 38, as illustrated in FIG. 2, receives the vehicle speed (vehicle velocity) from the vehicle speed detecting means 20 and the target driving force set by the target driving force calculating unit 29 as input and includes a search map in which an estimated power as an electric power loss is set.

Figure 17:
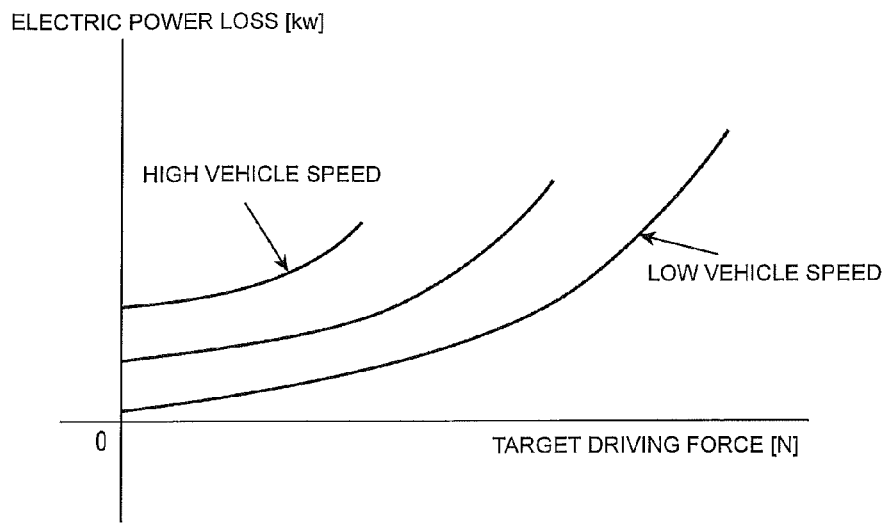
FIG. 17 is a diagram that illustrates an electric power loss search map.

At this time, the estimated power as an electric power loss, as illustrated in FIG. 17, increases as the target driving force increases, and the increasing rate thereof increases as the target driving force increases.

In addition, the estimated power as an electric power loss increases as the vehicle speed increases, and the target driving force that is a maximum value thereof decreases as the vehicle speed increases.

Figure 18:
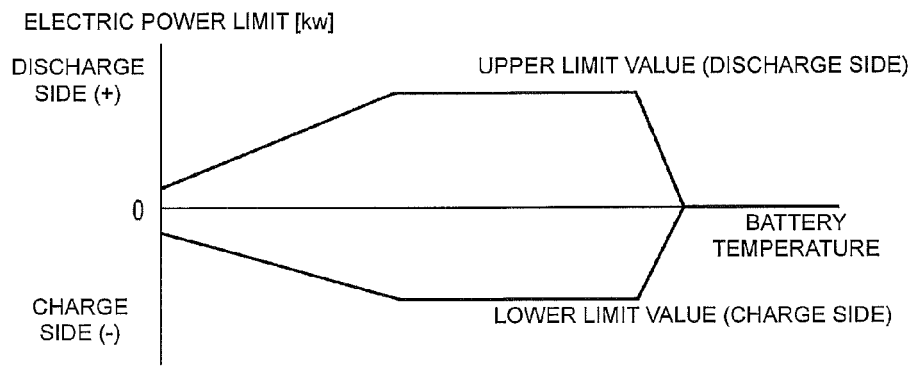
FIG. 18 is a diagram that illustrates an electric power upper limit/lower limit value search table according to the temperature of the battery.
Figure 19:
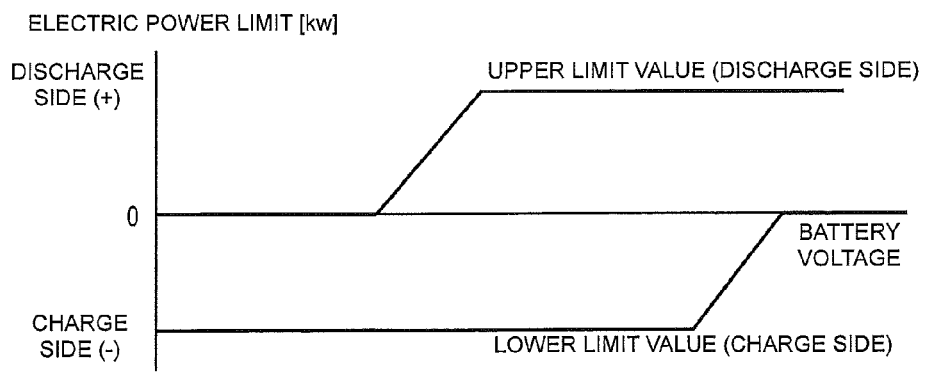
FIG. 19 is a diagram that illustrates an electric power upper limit/lower limit value search table according to the voltage of the battery.
Figure 20:
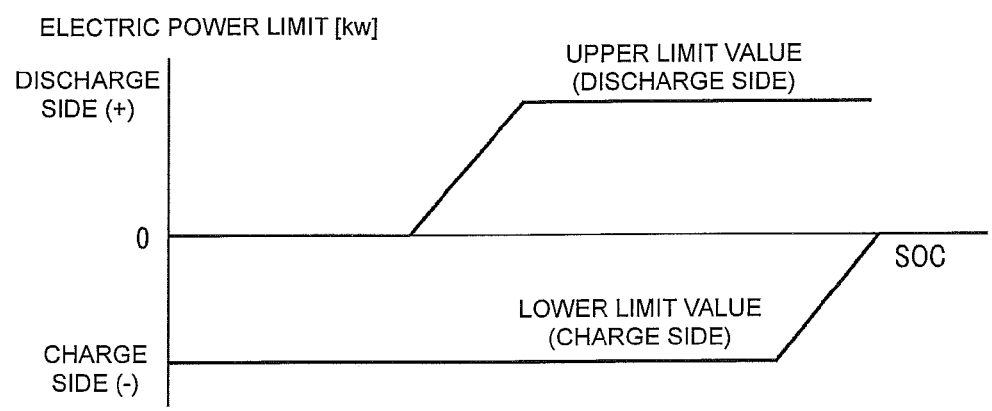
FIG. 20 is a diagram that illustrates an electric power upper limit/lower limit value search table according to the SOC.

The electric power upper limit/lower limit value calculating means 39 includes a table defining an upper limit value of the electric power and a lower limit value of the electric power with respect to the temperature of the battery illustrated in FIG. 18, a table defining an upper limit value of the electric power and a lower limit value of the electric power with respect to the voltage of the battery illustrated in FIG. 19, and a table defining an upper limit value of the electric power and a lower limit value of the electric power with respect to the SOC of the battery 18 illustrated in FIG. 20.

At this time, the electric power upper limit/lower limit value calculating means 39, as illustrated in FIG. 2, receives a target charge/discharge power from the target charge/discharge power setting means 23, the charge state SOC of the battery 18 from the battery charge state detecting means 21, and the temperature of the battery (also referred to as "battery temperature") and the voltage of the battery (also referred to as a "battery voltage") as the state of the battery, acquires an upper limit value and a lower limit value of the electric power, which are defined based on the input battery temperature, an upper limit value and a lower limit value of the electric power, which are defined based on the input battery voltage, and an upper limit value and a lower limit value of the electric power, which are defined based on the input SOC, compares the upper limit values and lower limit values of the electric power with each other with the estimated power subtracted therefrom, and outputs the upper limit value and the lower limit value of the electric power having highest restrictions to the target electric power calculating means 40.

As a result, by limiting the input/output power in accordance with the state of the battery, the battery 18 at the time of being charged and discharged can be protected from an excessive voltage, and the overdischarging/overcharging thereof can be prevented in consideration of the SOC.

In addition, four rotating components of the differential gear mechanism 15 are aligned in order of the rotating component connected to the first motor generator 5, the rotating component connected to the internal combustion engine 2, the rotating element connected to the driving shaft 8, and the rotating component connected to the second motor generator 6 sequentially in the alignment chart, the mutual lever ratio between the components is arranged as k1:1:k2 in the same order, and the torque correction value of the first motor generator 5 and the torque correction value of the second motor generator 6 are set so as to maintain the relation in which a value acquired by multiplying the torque correction value of the first motor generator 5 by k1 and a value acquired by multiplying the torque correction value of the second motor generator 6 by 1+k2 are the same.

Accordingly, the balance equation can be appropriately used in a case where the differential gear mechanism 15 including four rotating components similar to each other having mutually-different lever ratios is configured.

At this time, the feedback correction amounts set to the torque instruction values of the plurality of motor generators 5 and 6 are set based on and in association with the gear ratio or the lever ratio of the differential gear mechanism 15 having four rotating elements connected to the plurality of motor generators 5 and 6, the driving shaft 8, and the internal combustion engine 2.

In the above-described torque balance equation, as represented in Equation (4) to be described later, the target torques and the target engine torques of the plurality of motor generators 5 and 6 are balanced based on the lever ratio that is based on the gear ratio of the drive control device 1 that is a power input/output device that mechanically operates and connects the plurality of motor generators 5 and 6 and the internal combustion engine 2.

In the drive control device 1 of the hybrid vehicle, the motor torque instruction value calculating means 26 calculates torque instruction values Tmg1 and Tmg2 of the first and second motor generators 5 and 6 that are the plurality of motor generators using the torque balance equation including the target engine torque acquired at the target engine operating point and the electric power balance equation including the target charge/discharge power and can perform feedback correction of the torque instruction values Tmg1 and Tmg2 of the first and second motor generators 5 and 6 that are the plurality of motor generators such that the actual engine rotation speed converges on the target engine rotation speed acquired at the target engine operating point.

When feedback correction is performed, the motor torque instruction value calculating means 26 calculates the torque correction values (also referred to as "feedback correction torque Tmg1$fb$") of the first motor generator 5 out of the plurality of motor generators 5 and 6 and the torque correction values (also referred to as "feedback correction torque Tmg2$fb$") of the second motor generator 6 based on the actual engine rotation speed and the target engine rotation speed and sets a ratio between the feedback correction torque Tmg1$fb$ that is a torque correction value of the first motor generator 5 and a feedback correction torque Tmg2$fb$ that is a torque correction value of the second motor generator 6 to be a predetermined ratio that is based on the lever ratio of the drive control device 1 of the hybrid vehicle.

From this, the change of the torque of the internal combustion engine 2 is offset with the driving shaft 8 as a supporting point by using the torque balance equation that is in consideration of a change in the torque, and accordingly, even when a change of the torque of the internal combustion engine 2 occurs, it does not affect the torque of the driving shaft.

The target engine power calculating means 24 calculates the target engine power based on the target driving power, the target charge/discharge power, and the predicted power that is an electric power loss, and the electric power upper limit/lower limit value calculating means 39 determines the upper limit value and the lower limit value of the electric power by subtracting the estimated power from the retrieved value acquired from the search table based on the temperature, the voltage, and the SOC as the state parameters of the battery 18.

Accordingly, based on the target engine power calculated in consideration of the power loss, the target engine operating point and the target electric power are calculated, and the torque instruction values of the plurality of motor generators 5 and 6 are calculated, and accordingly, an error due to a variation of the electric power loss according to a difference between the vehicle speed and the target driving force decreases, and the control accuracy of the SOC of the battery 18 is improved. Therefore, the target driving force can be secured while the target charging/discharging is secured.

Next, the operation will be described.

Figure 4:
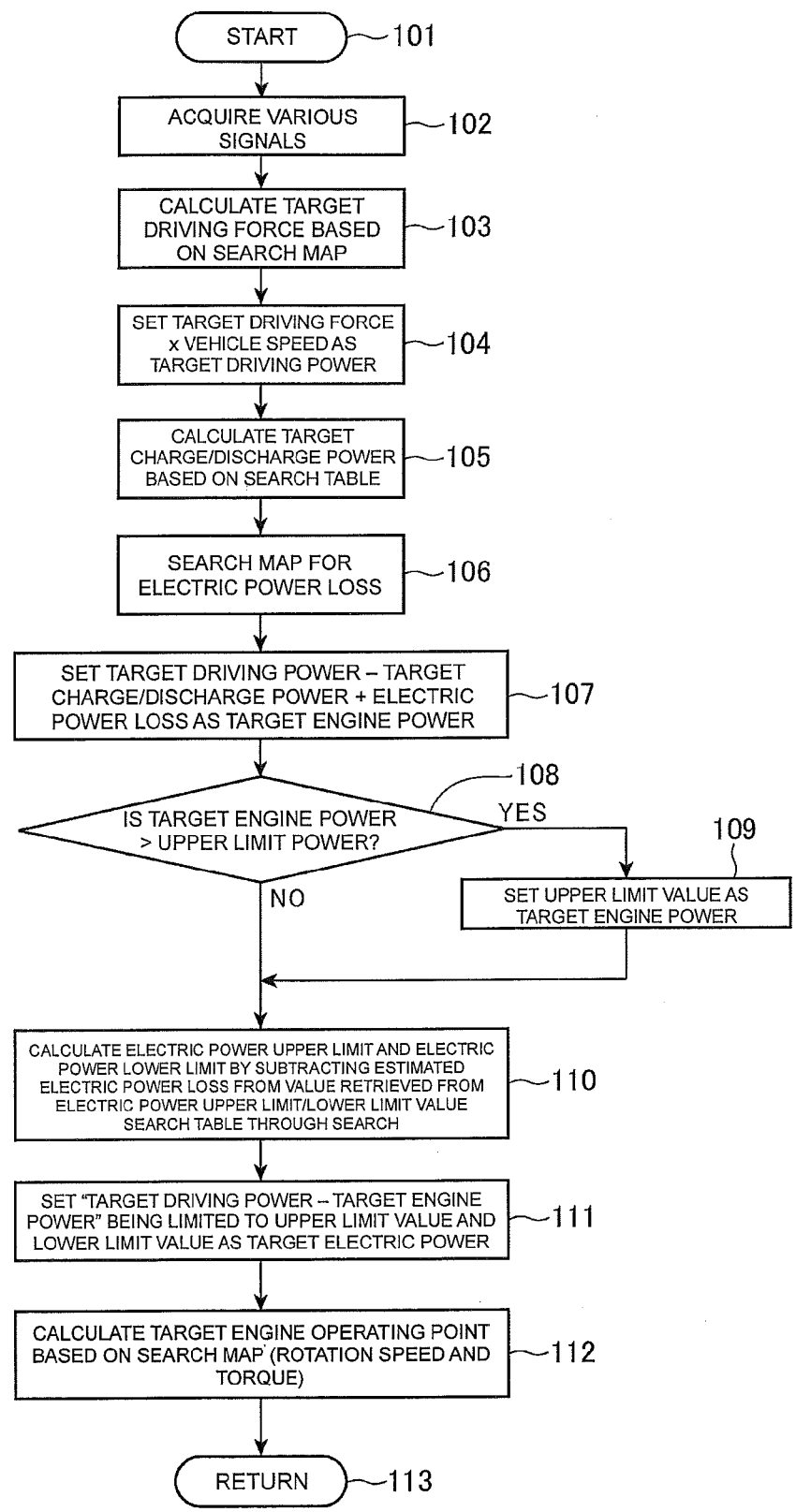
FIG. 4 is a flowchart of controlling the calculation of an engine target operating point and target electric power.

In the flowchart illustrated in FIG. 4 for controlling the calculations of the engine target operating point and the target electric power, a target engine operating point (a target engine rotation speed and a target engine torque) based on the amount of the driver's operation of the accelerator and the vehicle speed. In addition, in the flowchart illustrated in FIG. 5 for calculating the motor torque instruction values, the target torques of the first motor generator 5 and the second motor generator 6 are calculated based on the target engine operating point.

First, when the program illustrated in FIG. 4 for controlling the calculation of the engine target operating point and the target electric power starts (101), the process proceeds to Step 102 in which an accelerator opening degree detection signal supplied from the accelerator opening degree detecting means 19 formed by an accelerator opening sensor, a vehicle speed detection signal supplied from the vehicle speed detecting means 20 formed by a vehicle speed sensor, a detection signal of the charge state SOC of the battery 18 supplied from the battery charge state detecting means 21, the battery temperature that is the temperature of the battery, and the battery voltage that is the voltage of the battery, in other words, various signals used for the control process are taken in.

Then, the process proceeds to Step 103 in which a target driving force is detected from the target driving force detection map illustrated in FIG. 6.

In Step 103, a target driving force according to the vehicle speed and the accelerator opening degree is calculated based on the target driving force detection map illustrated in FIG. 6.

At this time, in a case where the accelerator opening degree=0, the target driving force is set to a negative value so as to be a driving force in a deceleration direction corresponding to engine braking in a high vehicle speed region and is set to a positive value for slow driving in a low vehicle speed region.

After Step 103 in which the target driving force is detected from the target driving force detection map illustrated in FIG. 6, the process proceeds to Step 104 in which target driving power is calculated by multiplying the target driving force calculated in Step 103 by the vehicle speed.

In Step 104, the target driving power that is a power required for driving the vehicle with the target driving force is calculated by multiplying the target driving force calculated in Step 103 by the vehicle speed.

In addition, after Step 104 in which the target driving power is calculated by multiplying the above-described target driving force by the vehicle speed, the process proceeds to Step 105 in which a target charge/discharge power is calculated based on the target charge/discharge power search table illustrated in FIG. 7.

In Step 105, in order to control the charge state SOC of the battery 18 within a normal use range, the target charge/discharge amount is calculated based on the target charge/discharge power search table illustrated in FIG. 7.

At this time, in Step 105, the charge power increases so as to prevent overdischarge of the battery 18 in a case where the charge state SOC of the battery 18 is low and increases the discharge power so as to prevent overcharge in a case where the charge state SOC of the battery 18 is high.

For the convenience of description, the discharge side is regarded as a positive value, and the charge side is regarded as a negative value.

In addition, after Step 105 in which the target charge/discharge power is calculated based on the target charge/discharge power search table, the process proceeds to Step 106 in which the estimated values of the power losses in the first and second motor generators 5 and 6 are searched from the electric power loss search map illustrated in FIG. 17.

The time point of Step 106 is before the determination of the operating point of the motor, and accordingly, the electric power loss cannot be calculated based on the electric power loss search map of the motor.

Accordingly, approximate values of the electric power loss are set in advance with the vehicle speed and the target driving force set as parameters, and an electric power loss is calculated through a search.

After Step 106 in which an estimated value of the electric power loss is searched from the electric power loss search map, the process proceeds to Step 107 in which the target engine power to be output by the internal combustion engine 2 is calculated based on the target driving power, the target charge/discharge power, and the electric power loss.

In Step 107, the target engine power that is the power to be output by the internal combustion engine 2 has a value acquired by adding (subtracting in the case of discharge) power for charging the storage battery to power required for driving the vehicle.

In Step 107, since the charge side is regarded as a negative value, the target engine power is calculated by subtracting the target charge/discharge power from the target driving power.

In addition, after Step 107 in which the target engine power is calculated, the process proceeds to Step 108 in which whether or not the target engine power calculated in Step 107 exceeds the upper limit power is determined.

In Step 108, in a case where the determination is "Yes", the process proceeds to Step 109 in which the target engine power is set to the upper limit value, and the process proceeds to Step 110. On the other hand, in a case where the determination is "No", the process directly proceeds to the next Step 110.

In other words, in Steps 108 and 109 described above, the upper limit guard of the target engine power is performed.

Here, the upper limit value is a maximum value of the output that can be performed by the internal combustion engine 2.

In addition, in Step 110, the upper limit value and the lower limit value of the electric power are calculated by subtracting the estimated value of the electric power loss from the retrieved values of the electric power upper limit/lower limit value search table.

In other words, in Step 110, an upper limit value and a lower limit value of the electric power are calculated based on each electric power upper limit/lower limit value search table according to the battery temperature, the battery voltage, and the charge state SOC of the battery 18 illustrated in FIGS. 18 to 20.

At this time, since the discharge side is regarded as a positive value, and the charge side is regarded as a negative value, among the values calculated in each electric power upper limit/lower limit value search table, a minimum value of the discharge side calculated as the upper limit value of the electric power, and a value of the charge side of which the absolute value is a minimum is calculated as the lower limit value of the electric power.

FIG. 18 illustrates an example of limiting using the battery temperature. When the temperature is low, the reaction rate of the battery decreases, and electric power that can be charged or discharged decreases. On the other hand, in a case where the battery temperature is high, it is necessary to limit the charge/discharge electric power so as to prevent an increase in the temperature.

FIG. 19 illustrates an example of limiting using the battery voltage. In a battery, there are an upper limit voltage and a lower limit voltage for the protection thereof, and when the battery is used over the range, the battery is degraded. Accordingly, it is necessary to limit the charging in a case where the voltage is high, and it is necessary to limit the discharging in a case where the voltage is low.

FIG. 20 illustrates an example of limiting using the charge state SOC of the battery 18. The charge state SOC of the battery 18 needs to be prevented from overdischarge or overcharge. Thus, when the charge state SOC is low, the discharge needs to be limited, and, when the charged state SOC is high, the charge needs to be limited.

In addition, in the target charge/discharge power search table illustrated in FIG. 7, in order to prevent an overcharge, when the charge state SOC of the battery 18 is high, the charge power is set to be low, and this value is for setting the power generation power using the engine power and, in the case of charging according to regenerative power generation on a downward slope is limited by the limit value of the charge side illustrated in FIG. 20.

In a case where the driving force requested from the driver needs power assistance according to the battery, power assistance is performed as described later and, in such a case, the charge state SOC of the battery 18 is lowered in accordance with the consumed power. When the power assistance is frequently performed, the power assistance is performed again before the charge state SOC of the battery 18 is recovered, and accordingly, the charge state SOC of the battery 18 is gradually lowered. In such a case, the discharge side is limited.

Then, by subtracting the estimated value of the electric power loss from the calculated upper limit/lower limit value, resultant values are set as the final upper limit/lower limit value of the electric power.

After Step 110 in which the upper limit value and the lower limit value of the electric power are calculated by subtracting the estimated value of the electric power loss from retrieved values of the electric power upper limit/lower limit value search table, the process proceeds to Step 111 in which the target electric power is calculated by subtracting the target engine power from the target driving power and limiting the target electric power to the upper limit value and the lower limit value of the electric power.

In Step 111, in a case where the target driving power is higher than the target engine power, the target electric power has a value that represents the assistance power according to the electric power of the battery.

On the other hand, in a case where the target engine power is higher than the target driving power, the target electric power has a value that represents the charge electric power for the battery.

Then, after Step 111 in which the target electric power is calculated by subtracting the target engine power from the target driving power and limiting the target electric power to the upper limit value and the lower limit value of the electric power, the process proceeds to Step 112 in which a target engine operating point is calculated based on the target engine operating point search map.

Figure 8:
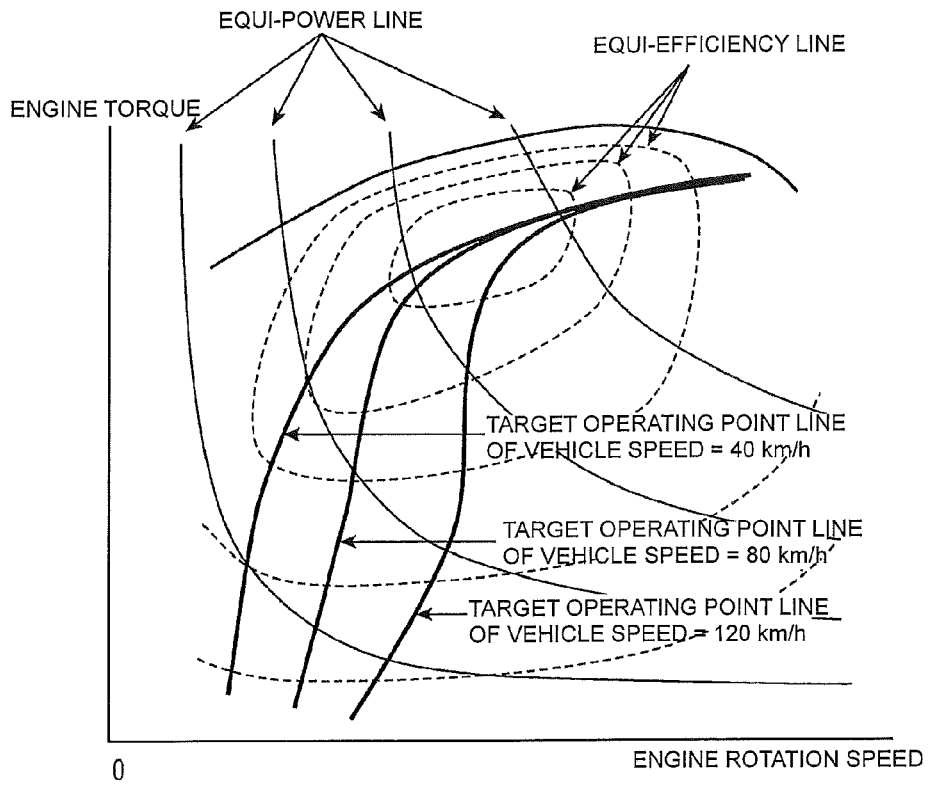
FIG. 8 is a target engine operating point search map configured by engine torque and an engine rotation speed.

In Step 112, a target engine operating point (the rotation speed and the torque) corresponding to the target engine power and the vehicle speed are calculated based on the target engine operating point search map illustrated in FIG. 8.

After Step 112 in which the target engine operating point is calculated based on the target engine operating point search map, the process proceeds to a returning process (113) of the program for controlling the calculation of the engine target operating point and the target electric power.

In the target engine operating point search map illustrated in FIG. 8, points at which the total efficiency acquired by adding the efficiency of the power transmission system configured by the differential gear mechanism 15 and the first and second motor generators 5 and 6 to the efficiency of the internal combustion engine 2 on the equi-power line is improved are selected for each power level, and a line acquired by joining the points is set as a target operating point line.

The target operating point line is set for each vehicle speed.

At this time, the set value may be acquired through an experiment or may be acquired through a calculation that is based on the efficiency of the internal combustion engine 2 and the first and second motor generators 5 and 6.

In addition, the target operating point line is set to move to the high rotation side as the vehicle speed increases.

The reason for this is as follows.

In a case where the same engine operating point is set as the target engine operating point regardless of the vehicle speed, as illustrated in FIG. 9, the rotation speed of the first motor generator 5 is positive in a case where the vehicle speed is low, and the first motor generator 5 serves as a power generator, and the second motor generator 6 serves as an electric motor (see point A).

Then, as the vehicle speed increases, the rotation speed of the first motor generator 5 approaches zero (see point B), and, when the vehicle speed further increases, the rotation speed of the first motor generator 5 becomes negative. In this state, the first motor generator 5 operates as an electric motor, and the second motor generator 6 operates as a power generator (see point C).

In a case the vehicle speed is low (states of points A and B), since the circulation of the power does not occur, the target operating point, like the target operating point line of the vehicle speed=40 km/h illustrated in FIG. 8, is close to a point at which the engine efficiency is high on the whole.

However, in a case where the vehicle speed is high (state of point C), the first motor generator 5 operates as an electric motor, the second motor generator 6 operates as a power generator, and accordingly, the circulation of the power occurs, whereby the efficiency of the power transmission system is lowered.

Figure 11:
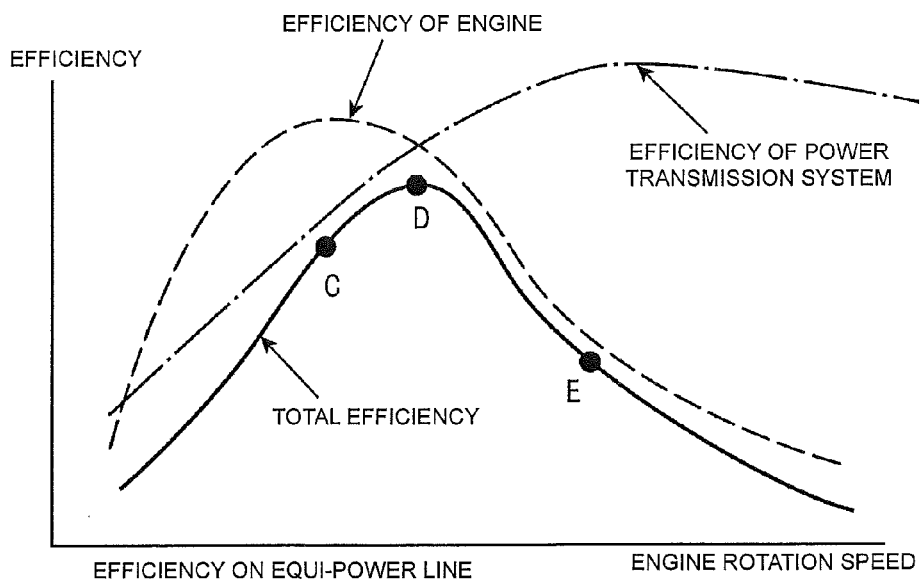
FIG. 11 is a diagram that illustrates the efficiency on a power line that is formed by efficiency and an engine rotation speed.

Accordingly, as illustrated at point C illustrated in FIG. 11, the efficiency of the power transmission system is lowered even when the efficiency of the internal combustion engine 2 is high, and accordingly, the total efficiency is lowered.

Figure 12:
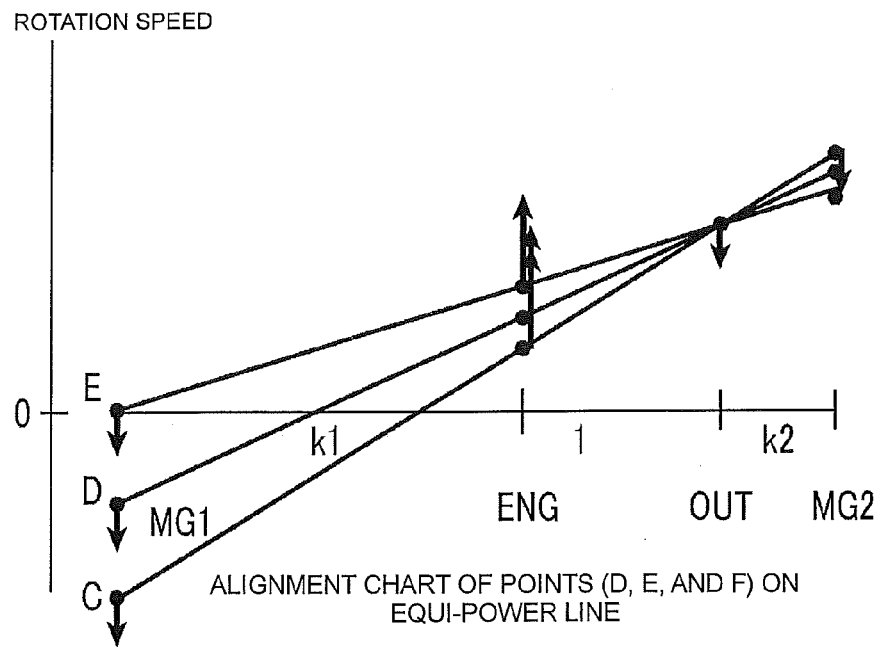
FIG. 12 is an alignment chart of points (D, E, and F) on an equi-power line.

Thus, in order to not cause the circulation of power to occur in the high vehicle speed region, like point E in the alignment chart illustrated in FIG. 12, the rotation speed of the first motor generator 5 may be set to zero or higher. However, in such a case, the operating point moves in a direction in which the engine rotation speed of the internal combustion engine 2 increases. Thus, as illustrated in point E illustrated in FIG. 11, even when the efficiency of the power transmission system is high, the efficiency of the internal combustion engine 2 is greatly lowered, whereby the total efficiency is lowered.

Accordingly, as illustrated in FIG. 11, a point at which the total efficiency is high is point D therebetween, and, by setting this point as the target operating point, an operation having the highest efficiency can be performed.

As above, in FIG. 10, three operating points of points C, D, and E are represented on the target operating point search map. In a case where the vehicle speed is high, it can be understood that an operating point at which the total efficiency is the highest moves to a further high rotation side than an operating point at which the engine efficiency is the highest.

Next, the calculation of the target torques of the first and second motor generators 5 and 6 used for setting the amount of charge/discharge of the battery 18 as a target value while the target driving force is output will be described along the flowchart for the calculation of the motor torque instruction values illustrated in FIG. 5.

Figure 5:
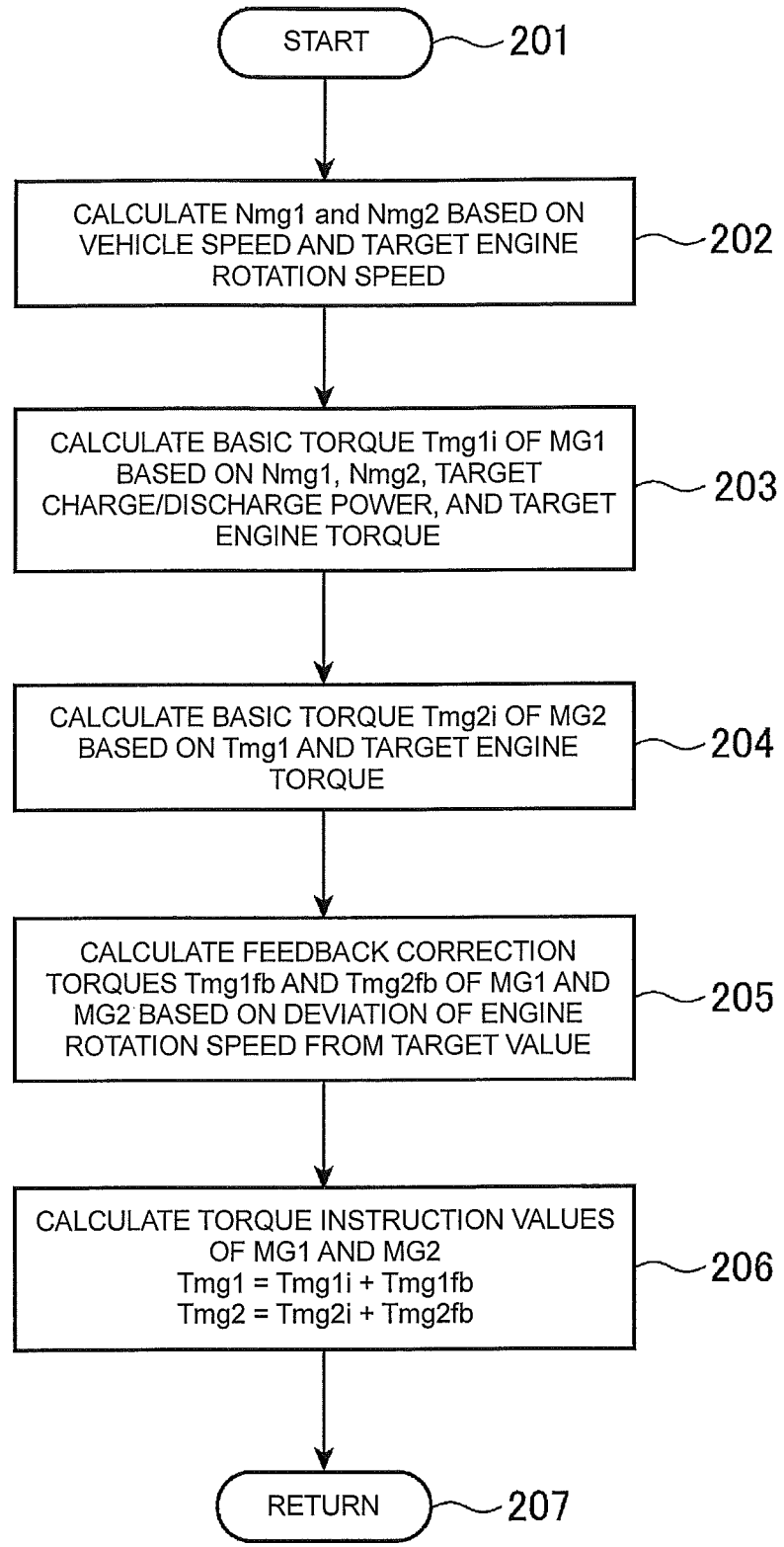
FIG. 5 is a flowchart of calculating a motor torque instruction value.

When a program illustrated in FIG. 5 for calculating motor torque instruction values starts (201), the process proceeds to Step 202 in which the MG1 rotation speed Nmg1t of the first motor generator 5 and the MG2 rotation speed Nmg2t of the second motor generator 6 are calculated.

In Step 202, a driving shaft rotation speed No of the planetary gear is calculated based on the vehicle speed.

Then, the MG1 rotation speed Nmg1t of the first motor generator 5 and the MG2 rotation speed Nmg2t of the second motor generator 6 in a case where the engine rotation speed is the target engine rotation speed Net are calculated by using the following equations.

These numerical expressions are acquired based on the relation of the rotation speeds of the planetary gears.

$$Nmg1t=(Net-No)*k1+Net \qquad \text{Equation (1)}$$

$$Nmg2t=(No-Net)*k2+No \qquad \text{Equation (2)}$$

Here, k1 and k2, as will be described later, are values that are determined based on the gear ratio of the planetary gear.

Next, the process proceeds to Step 203 in which the basic torque Tmg1i of the first motor generator 5 is calculated based on the MG1 rotation speed Nmg1t of the first motor generator 5 and the MG2 rotation speed Nmg2t of the second motor generator 6, which have been acquired in Step 202, the target charge/discharge power Pbatt, and the target engine torque Tet.

In Step 203, the basic torque Tmg1i of the first motor generator 5 is calculated by using the following Equation (3).

$$Tmg1i=(Pbatt*60/2\pi-Nmg2t*Tet/k2)/(Nmg1t+Nmg2t*(1+k1)/k2) \qquad \text{Equation (3)}$$

This Equation (3) can be derived by solving simultaneous equations formed by Equation (4) representing the balance of torques input to the planetary gears, which is represented as below, and Equation (5) representing that the electric power generated or consumed by the first and second motor generators 5 and 6 and the input/output electric power Pbatt for the battery 18 are the same.

$$Te+(1+k1)*Tmg1=k2*Tmg2 \qquad \text{Equation (4)}$$

$$Nmg1*Tmg1*2\pi/60+Nmg2*Tmg2*2\pi/60=Pbatt \qquad \text{Equation (5)}$$

After Step 203 in which the basic torque Tmg1i of the first motor generator 5 is calculated, the process proceeds to Step 204 in which the basic torque Tmg2i of the second motor generator 6 is calculated based on the basic torque Tmg1i of the first motor generator 5 and the target engine torque.

In Step 204, the basic torque Tmg2i of the second motor generator 6 is calculated using the following Equation (6).

$$Tmg2i=(Te+(1+k1)*Tmg1i)/k2 \qquad \text{Equation (6)}$$

Equation (6) is derived from Equation (4) described above.

After Step 204 in which the basic torque Tmg2i of the second motor generator 6 is calculated, the process proceeds to Step 205 in which the feedback correction torques Tmg1fb and Tmg2fb of the first and second motor generators 5 and 6 are calculated.

In Step 205, in order to approach the engine rotation speed to the target, the feedback correction torque Tmg1fb of the first motor generator 5 and the feedback correction torque Tmg2fb of the second motor generator 6 are calculated by multiplying the deviations of the engine rotation speeds from the target engine rotation speed by a predetermined feedback gain set in advance.

After Step 205 in which the feedback correction torques Tmg1fb and Tmg2fb of the first and second motor generators 5 and 6 are calculated, the process proceeds to Step 206 in which the torque instruction value Tmg1 for controlling the first and second motor generators 5 and 6 is calculated.

In Step 206, the torque instruction value Tmg1 for controlling the first and second motor generators 5 and 6 is calculated by adding each feedback correction torque to each basic torque.

Then, by controlling the first and second motor generators 5 and 6 in accordance with the torque instruction value Tmg1 for the control, even when the engine torque varies in accordance with external disturbances, the charging/discharging for the battery 18 can have a value close to the target value while the target driving force is output.

After Step 206 in which the torque instruction value Tmg1 for controlling the first and second motor generators 5 and 6 is calculated, the process proceeds to a returning process 207.

FIGS. 13 to 16 illustrate alignment charts in representative operating states.

Here, values k1 and k2 determined based on the gear ratio of the planetary gear formed are defined as below.
k1=ZR1/ZS1
k2=ZS2/ZR2
ZS1: PG1 the number of teeth of sun gear
ZR1: PG1 the number of teeth of ring gear
ZS2: PG2 the number of teeth of sun gear
ZR2: PG2 the number of teeth of ring gear Next, the operation states will be described using an alignment chart.

In addition, in the rotation speed, the rotation direction of the internal combustion engine 2 is set as the positive direction and, in the torque that is input/output to/from each shaft, a direction in which a torque having the same direction as that of the torque of the internal combustion engine 2 is input is defined as positive.

Accordingly, in a case where the torque of the driving shaft is positive, a state is formed in which the torque for driving the vehicle to the rear side is output (deceleration at the time of forward driving and driving at the time of backward driving). On the other hand, in a case where the torque of the driving shaft is negative, a state is formed in which the torque for driving the vehicle to the front side is output (driving at the time of forward driving, and deceleration at the time of backward driving).

In a case where the power generation or backward driving ("powering": acceleration by transmitting power to the drive wheel 7 or maintaining a balanced speed on an ascending slope) is performed by using a motor, there are losses due to heat generation in the inverters and the motors, and accordingly, the efficiency is not 100% in a case where a conversion between electric energy and mechanical energy is made. However, for the simplification of description, it is assumed that there is no loss.

In a case where the loss is considered for practical implementation, power generation may be controlled so as to additionally generate power corresponding to the energy that is lost due to the loss.

(1) Low Gear Ratio State

Driving is performed using the internal combustion engine, and a state is formed in which the rotation speed of the second motor generator 6 is zero.

Figure 13:
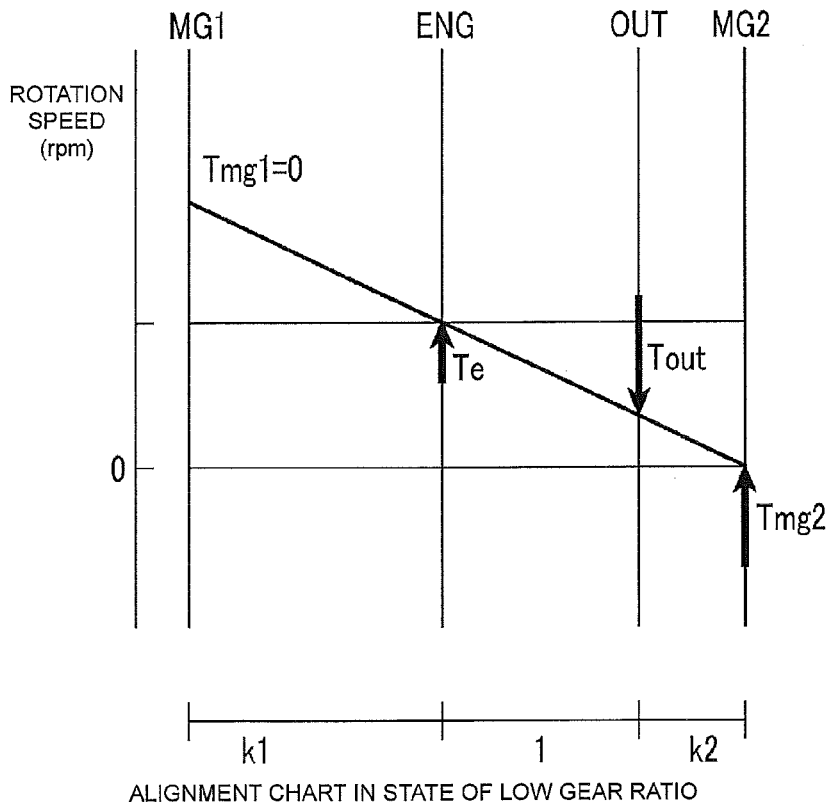
FIG. 13 is an alignment chart of the state of a low gear ratio.

The alignment chart at this time is illustrated in FIG. 13.

Since the rotation speed of the second motor generator 6 is zero, no power is consumed.

Thus, in a case where there is no charge/discharge of the storage battery, power generation using the first motor generator 5 does not need to be performed, and the torque instruction value Tmg1 of the first motor generator 5 is zero.

In addition, the ratio between the engine rotation speed and the rotation speed of the driving shaft is (1+k2)/k2.

(2) Intermediate Gear Ratio State

Driving is performed using the internal combustion engine 2, and a state is formed in which the rotation speeds of the first and second motor generators 5 and 6 are positive.

Figure 14:
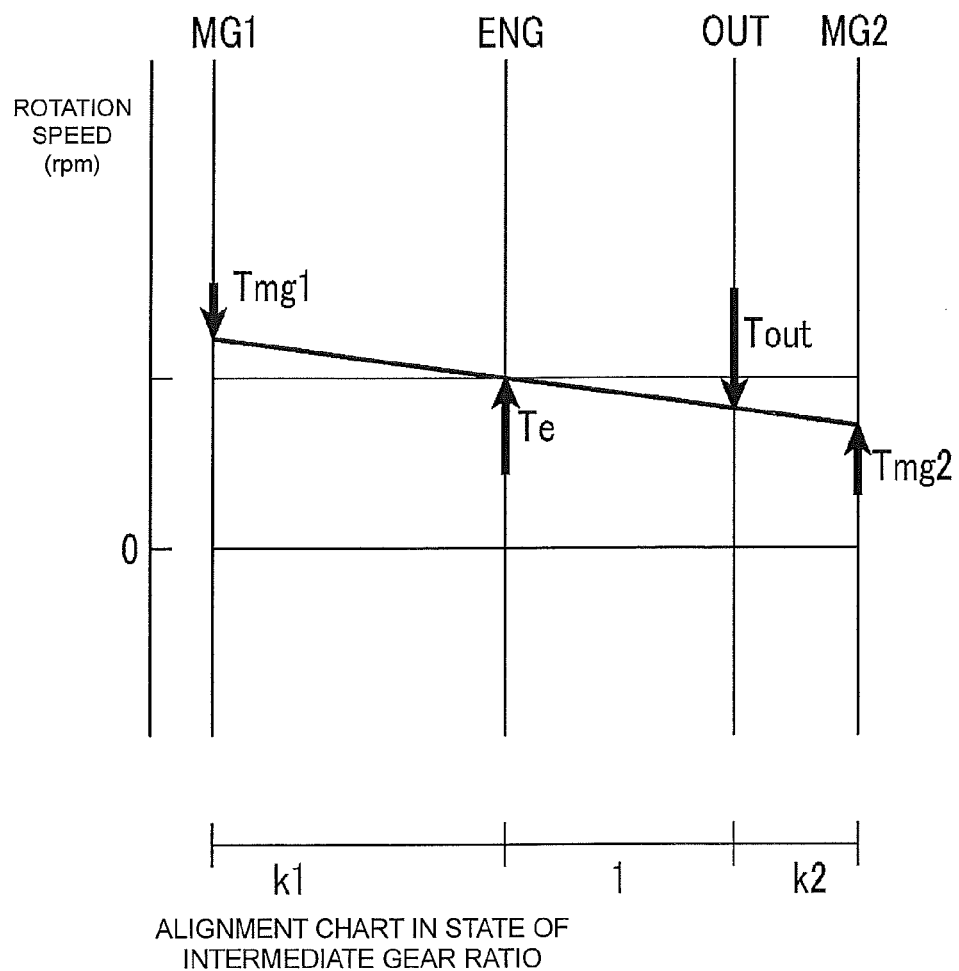
FIG. 14 is an alignment chart of the state of an intermediate gear ratio.

The alignment chart at this time is illustrated in FIG. 14.

In this case, in a case where there is no charge/discharge of the storage battery, the first motor generator 5 is regenerated, and the second motor generator 6 is reversely operated using the regenerated electric power.

(3) High Gear Ratio State

Driving is performed using the internal combustion engine 2, and a state is formed in which the rotation speed of the first motor generator 5 is zero.

Figure 15:
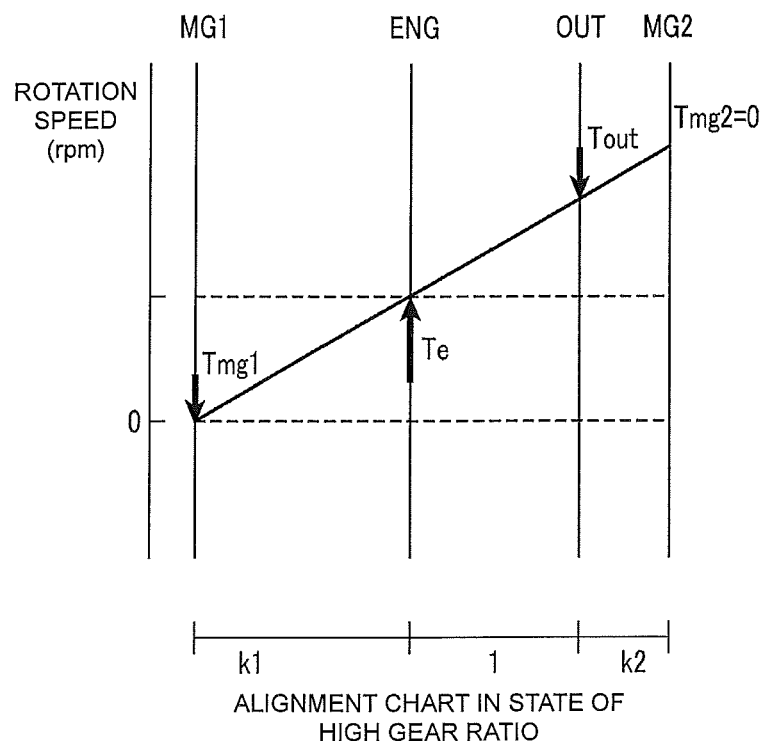
FIG. 15 is an alignment chart of the state of a high gear ratio.
Figure 16:
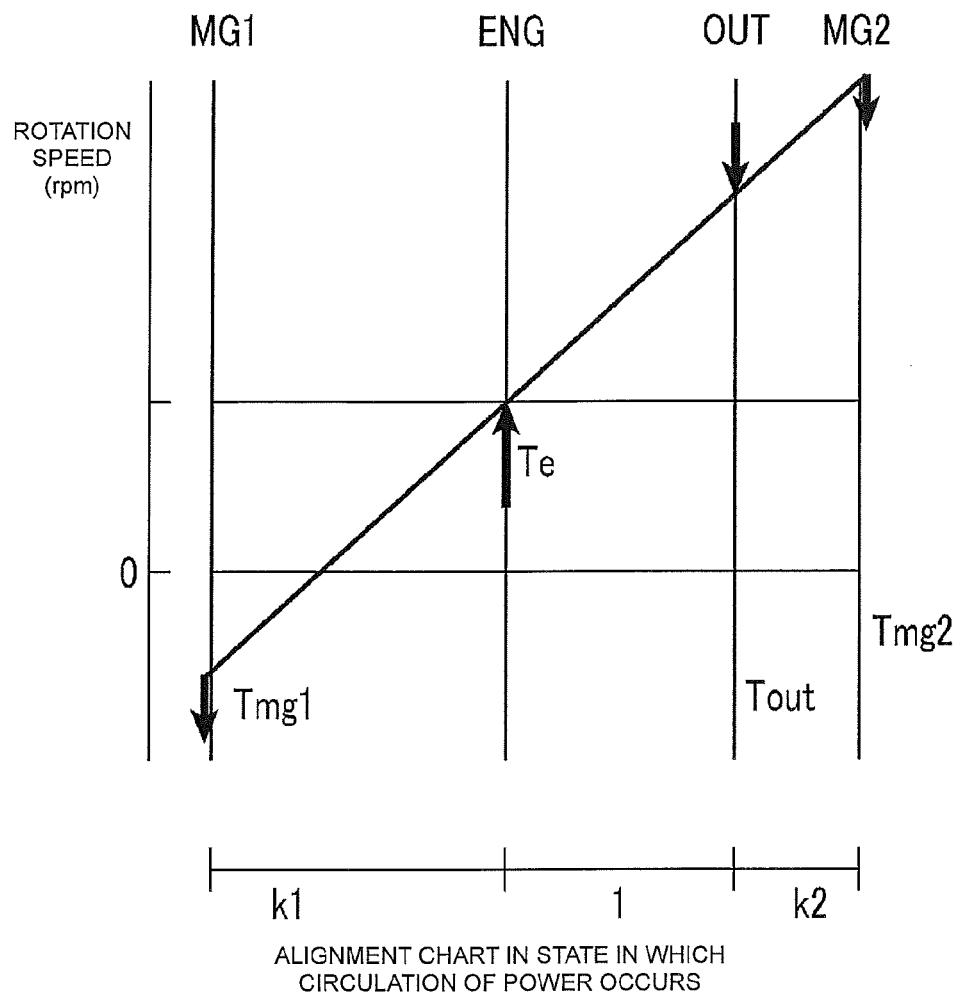
FIG. 16 is an alignment chart of the state in which power circulation occurs.

The alignment chart at this time is illustrated in FIG. 15.

Since the rotation speed of the first motor generator 5 is zero, regeneration is not performed.

Accordingly, in a case where there is no charge/discharge of the storage battery, the reverse operation or the regeneration is not performed by the second motor generator 6, and the torque instruction value Tmg2 of the second motor generator 6 is zero.

In addition, the ratio between the engine rotation speed and the rotation speed of the driving shaft is k1/(1+k1).

(4) State in which Power Circulation is Performed

In a state in which the vehicle speed is higher than the high gear ratio state, a state is formed in which the first motor generator 5 is reversely rotated.

In this state, the first motor generator 5 is reversely operated, thereby consuming the electric power.

Accordingly, in a case where there is no charge/discharge of the storage battery, the second motor generator 6(5) is regenerated and performs power generation.

In other words, according to the embodiment of the present invention, in a hybrid vehicle that drives the driving shaft 8 connected to the drive wheel 7 by combining the output of the internal combustion engine 2, the power of the first motor generator 5, and the power of the second motor generator 6 as a major configuration, in a control device that acquires the target driving power based on the vehicle speed and the target driving force having the amount of the operation of the accelerator and the vehicle speed as parameters, acquires the target charge/discharge power based on the SOC, predicts the power loss based on the vehicle speed and the target driving force, the target engine power is acquired by performing adding/subtracting of the target charge/discharge power and the electric power loss for the target driving power, the target engine operating point is acquired based on the target engine power, the target electric power that is a target value of the input/output electric power to/from the battery is acquired based on a difference between the target driving power and the target engine power, and the control instruction values of the MG1 torque and the MG2 torque are calculated using the torque balance equation including the target engine torque and the electric power balance equation including the target electric power, the target electric power is limited in a range of a value acquired by subtracting the electric power loss from the input/output limit power of the battery.

From this, by calculating the motor torque in consideration of the electric power losses of the first motor generator 5 and the second motor generator 6, the charge/discharge electric power in a case where the driving assistance is performed using the electric power of the battery 18 can be appropriately limited, whereby overdischarge at the time of performing assistance or overload of the battery can be prevented.

In addition, in a case where regeneration is performed at the time of deceleration, regeneration can be performed near the limit of the battery, whereby the amount of regeneration can increase.

REFERENCE SIGNS LIST 1 drive control device of hybrid vehicle (also referred to as "power input/output device)
2 internal combustion engine (also referred to as "E/G" or "ENG")
3 output shaft
4 one-way clutch
5 first motor generator (also referred to as "MG1" or "first electric motor")
6 second motor generator (also referred to as "MG2" or "second electric motor")
7 drive wheel
8 driving shaft
9 first planetary gear (also referred to as "PG1")
10 second planetary gear (also referred to as "PG2")
11 air content adjusting means
12 fuel supplying means
13 ignition means
14 output gear
15 differential gear mechanism
16 first inverter
17 second inverter
18 battery
19 accelerator opening degree detecting means
20 vehicle speed detecting means
21 battery charge state detecting means
22 target driving power setting means
23 target charge/discharge power setting means
24 target engine power calculating means
25 target engine operating point setting means
26 motor torque instruction value calculating means
27 drive control unit
28 engine rotation speed detecting means
29 target driving force calculating unit
30 target driving power calculating unit
31 to 37 first to seventh calculation units
38 electric power loss predicting means
39 electric power upper limit/lower limit value calculating means
40 target electric power calculating means

The invention claimed is:

1. A drive control device of a hybrid vehicle comprising:
an internal combustion engine that includes an output shaft;
a driving shaft that is connected to a drive wheel;
first and second motor generators;
a differential gear mechanism that includes four rotating components connected to a plurality of the motor generators, the driving shaft, and the internal combustion engine;
an accelerator opening degree detecting means that detects the accelerator opening degree;
a vehicle speed detecting means that detects a vehicle speed;
a battery charge state detecting means that detects a charge state of a battery;
a target driving power setting means that sets a target driving power based on the accelerator opening degree that is detected by the accelerator opening degree detecting means and the vehicle speed detected by the vehicle speed detecting means;
a target charge/discharge power setting means that sets a target charge/discharge power based on at least the charge state of the battery that is detected by the battery charge state detecting means;
a target engine power calculating means that calculates a target engine power based on the target driving power of the target driving power setting means and the target charge/discharge power of the target charge/discharge power setting means;
a target engine operating point setting means that sets a target engine operating point based on the target engine power and total system efficiency;
a motor torque instruction value calculating means that sets torque instruction values of the plurality of the motor generators;
an electric power loss predicting means that calculates an estimated power that is an electric power loss of the motor generators based on the vehicle speed and the target driving force;
an electric power upper limit/lower limit value calculating means that determines an electric power upper limit and an electric power lower limit for limiting an input/output electric power for the battery by subtracting the estimated power from a value that is set based on the battery state parameters; and
a target electric power calculating means that calculates a target electric power that is a target value of an input/output power from the battery based on a difference between the target engine power and the target driving power calculated at the target engine operating point and, when the target electric power comes off a range set by the electric power upper limit and the electric power lower limit, limits the target electric power to the electric power upper limit or the electric power lower limit,
wherein the motor torque instruction value calculating means calculates torque instruction values of the plurality of the motor generators using a torque balance equation including the target engine torque acquired at the target engine operating point and an electric power balance equation including the target electric power.

2. The drive control device of the hybrid vehicle according to claim 1,
wherein the target engine power calculating means calculates the target engine power by adding the estimated power to a value calculated by the target driving power and the target charge/discharge power, and
wherein the electric power upper limit/lower limit value calculating means determines the electric power upper limit or the electric power lower limit by subtracting the estimated power from a retrieved value acquired through a search from a search table based on a temperature, a voltage, and an SOC as the battery state parameters.

* * * * *